(12) United States Patent
Felix et al.

(10) Patent No.: US 9,052,897 B2
(45) Date of Patent: Jun. 9, 2015

(54) METHOD AND SYSTEM FOR CONTROLLING A SUPPLY VOLTAGE

(75) Inventors: Steve Felix, Bristol (GB); Pete Cumming, Wickwar Gloucestershire (GB)

(73) Assignee: Nvidia Technology UK Limited, London (GB)

( * ) Notice: Subject to any disclaimer, the term of this patent is extended or adjusted under 35 U.S.C. 154(b) by 282 days.

(21) Appl. No.: 13/579,207

(22) PCT Filed: Feb. 22, 2011

(86) PCT No.: PCT/EP2011/052618
§ 371 (c)(1),
(2), (4) Date: Aug. 15, 2012

(87) PCT Pub. No.: WO2011/104241
PCT Pub. Date: Sep. 1, 2011

(65) Prior Publication Data
US 2012/0311374 A1    Dec. 6, 2012

(30) Foreign Application Priority Data
Feb. 23, 2010 (GB) .................... 1003017.9

(51) Int. Cl.
G06F 1/26 (2006.01)
G06F 1/32 (2006.01)
G06F 1/30 (2006.01)
G06F 9/44 (2006.01)

(52) U.S. Cl.
CPC ............... *G06F 1/3203* (2013.01); *G06F 1/30* (2013.01); *G06F 9/4401* (2013.01)

(58) Field of Classification Search
CPC .......... G06F 1/30; G06F 1/3203; G06F 9/4401
USPC ........................................................ 713/320
See application file for complete search history.

(56) References Cited

U.S. PATENT DOCUMENTS

| 5,218,705 | A  | * | 6/1993 | DeLuca et al. ............... 340/7.37 |
| 7,383,456 | B2 |   | 6/2008 | Ono |
| 7,392,413 | B2 | * | 6/2008 | Shikata ........................ 713/321 |
| 8,051,312 | B2 | * | 11/2011 | Foley ............................ 713/321 |
| 8,127,160 | B2 | * | 2/2012 | Bieswanger et al. ......... 713/321 |

(Continued)

FOREIGN PATENT DOCUMENTS

| CN | 1838081 A | 9/2006 |
| TW | 200737460 | 10/2007 |

(Continued)

OTHER PUBLICATIONS

Chinese office action dated Nov. 3, 2014, 8 pages.
Taiwan office action dated Jun. 30, 2014, 6 pages.

*Primary Examiner* — Mark Connolly

(57) ABSTRACT

Method and computing system for controlling a supply voltage in the computing system. A voltage related indication for use in setting the supply voltage of the computing system is stored, and a supply voltage is set for the computing system based on the stored voltage related indication. A crash of the computing system is detected, and in dependence thereon, an adjusted indication is determined for use in the computing system. An adjusted supply voltage is set based on the adjusted indication, and the adjusted indication is stored for further use of the computing system.

20 Claims, 2 Drawing Sheets

(56) References Cited

U.S. PATENT DOCUMENTS

2005/0188230 A1* 8/2005 Bilak .................... 713/300
2006/0218428 A1 9/2006 Hurd
2007/0174642 A1 7/2007 Cornwell et al.
2008/0155282 A1 6/2008 Gammie et al.

FOREIGN PATENT DOCUMENTS

| TW | 1334978 | 12/2010 |
|---|---|---|
| WO | 9013079 A1 | 11/1990 |
| WO | 2011104241 A1 | 9/2011 |

* cited by examiner

METHOD AND SYSTEM FOR CONTROLLING A SUPPLY VOLTAGE

CROSS-REFERENCE TO RELATED APPLICATION

This application is the National Stage of, and therefore claims the benefit of, International Application No. PCT/EP2011/052618 filed on Feb. 22, 2011, entitled "Method and System for Controlling a Supply Voltage," which was published in English under International Publication Number WO 2011/104241 on Sep. 1, 2011, and has a priority date of Feb. 23, 2010, based on GB application 1003017.9. Both of the above applications are commonly assigned with this National Stage application and are incorporated herein by reference in their entirety.

FIELD OF THE INVENTION

This invention relates to a method and a system for controlling a supply voltage.

BACKGROUND

The present invention lies in the field of active power management (APM) which means the short term control of processor clock frequencies and core supply voltage (Vdd) to minimise power consumption in an active mode. Active power management is generally handled by a fast power management component, where clock frequencies and voltages may need to be modified every few hundred microseconds. Decisions are based on short term application needs.

Many computing systems are required to run at particular speeds in order to function correctly. For example, a processor in a mobile terminal of a wireless communication network is required to operate at a particular speed in order to process call data in real-time to allow an operator of the terminal to engage in real-time communications with another person, without dropping the call. This is just one example of a computing system which is required to operate at a particular speed. In order to operate at the particular speed, the frequency of the clock signal used in the computing system is required to be at least a particular threshold value.

In order for a computing system to operate at high clock frequencies, a correspondingly high supply voltage is required. However, as the supply voltage used in the computing system increases, so does the power used by the computing system, which is disadvantageous. It is desirable to keep the supply voltage low, but not too low such that the computing system cannot operate at the required clock frequency.

Automatic tracking software can be used to select a required supply voltage for use in a computing system. For example an AVS (Automatic Voltage Scaling) function can be used to select the supply voltage.

The supply voltage is set in an attempt to accommodate the software that is running on the computing system. Specifically, as the software is executed the supply voltage will fluctuate as the supply current drawn as a consequence of the operations of the executed software can vary more quickly than the supply voltage regulator circuit can react. Such changes in supply voltage are known as supply 'bouncing', 'droop' 'transient response' or simply 'noise'. The voltage regulator circuit and its connection to the computing system will contain inductive and capacitive components and thus will have resonant frequencies which can increase the effect of the voltage 'bouncing' if the software happens to cause load transients at frequencies that excite these resonances. If the supply voltage becomes too low then logic in a critical timing path of the computing system can fail and some circuits can fail to work at any speed. For example WRITE operations, particularly to 6 transistor Static Random Access Memory (SRAM) cells, can be very susceptible to failure under low supply voltage conditions.

In order to avoid the failure of a critical path in the computing system, a voltage margin is implemented, such that in normal operating conditions the supply voltage is set slightly higher (by an amount that is the voltage margin) than the minimum voltage required in the critical path at the current clock frequency. This voltage margin allows the voltage to droop slightly as the software is operated without going below the minimum required to prevent the critical path from failing. The voltage margin is typically chosen to cover manufacturing and the software variability (i.e. a software factor). The voltage margins are chosen to be at a level that is considered 'safe' for any part in the critical path of the computing system at a particular speed.

The additional voltage margin increases the power consumption of the computing system in operation.

SUMMARY

The inventor has realised that most parts in the computing system do not require such a large voltage margin as is currently provided in computing systems. Therefore, these parts would be capable of operating at a lower voltage margin, thereby reducing power consumption of the computing system. On the other hand some parts require a larger voltage margin than is currently provided, for example, when parts age they may begin to require larger voltage margins. There is provided herein a method and system for adjusting the voltage margin used in the computing system to adapt to the specific computing system. In this way the voltage margin can be optimized for a particular computing system, to thereby reduce power consumption and/or reduce failures in the critical path of the computing system.

In accordance with a first aspect of the invention there is provided a method of controlling a supply voltage in a computing system, the method comprising: storing a voltage dependent parameter for use in setting the supply voltage of the computing system; setting a supply voltage for the computing system based on the stored parameter; detecting a crash of the computing system, and in dependence thereon, determining an adjusted voltage dependent parameter value for use in the computing system; setting an adjusted supply voltage based on the adjusted parameter; and storing the adjusted parameter for further use of the computing system.

The voltage dependent parameter (voltage related indication) can be a voltage margin for use in the computing system or any other measurable & controllable parameter that will affect the supply voltage margin. For example—if supply voltage is already controlled by using the difference between the desired and observed frequency of a supply voltage dependent oscillator located in the computing system as feedback; then the margin setting could be expressed as an offset to the desired frequency of said oscillator. In this case margin is expressed and stored as a frequency value—but would still affect supply voltage margin.

In accordance with a second aspect of the invention there is provided a computing system comprising: storage means for storing an indication for use in setting the supply voltage in the computing system;

setting means for setting a supply voltage for the computing system based on the stored indication;

determination means for detecting a crash of the computing system, and in dependence thereon for determining an adjusted indication for use in the computing system; wherein the computing system is configured to set an adjusted supply voltage based on the adjusted indication, and to store the adjusted indication for further use of the computing system.

In preferred embodiments, the voltage margin is set to a level below the 'safe' level for some of the manufactured parts. In this way the power consumption of the computing system is reduced. However, this reduction in voltage margin may result in some of the manufactured computing systems crashing due to failures in their critical paths when the supply voltage drops too low. The computing system is allowed to crash occasionally. It takes some time for a "watchdog timer" to timeout and for the computing system to reboot following a crash. When the computing system reboots following a crash, the voltage margin is increased. In this way, it becomes less likely that the computing system will crash again due to a low supply voltage. However, if the parts in the computing system work without crashing at the low voltage margin then the low voltage margin is used in the computing system, thereby reducing power consumption.

By adjusting the voltage margin in response to detecting crashes of the computing system, the voltage margin can be adapted to become the optimum voltage margin for the computing system, i.e. the lowest voltage margin that does not result in failures in the computing system.

However, circuit failure due to lack of voltage margin may not be the only cause of crashes. For example, software errors can cause the system to crash occasionally. When this happens, the voltage margin is increased unnecessarily.

To mitigate this, if the computing system has not crashed for some time, e.g. 24 hours, this may be a sign that the voltage margin currently being used is too high and that the computing system could actually operate at a lower voltage margin. In this case the voltage margin may be decremented. This would reduce the power consumption of the computing system. If reducing the margin leads to a crash, then the margin is simply increased again. The frequency of such margin reductions is kept relatively low so as not to cause noticeable disruption to the user due to too many crash & reboot operations.

Where a method for incrementing the voltage margin when crashes occur and a method for decrementing the voltage margin when crashes do not occur are both implemented, the voltage margin is advantageously adjusted to be optimized to the current conditions of the computing system.

Rather than using a fixed voltage margin as in the prior art, the inventor has realised that it can be advantageous to adjust the voltage margin in dependence upon the occurrence of crashes in the computing system. In this way, the voltage margin can be optimized.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

A preferred embodiment will now be described by way of example with reference to FIGS. 1 and 2. This preferred example is described by way of example only and the specific features of the preferred embodiment are not intended to be limiting on the scope of protection, the scope of protection being defined by the claims.

Figure 1:
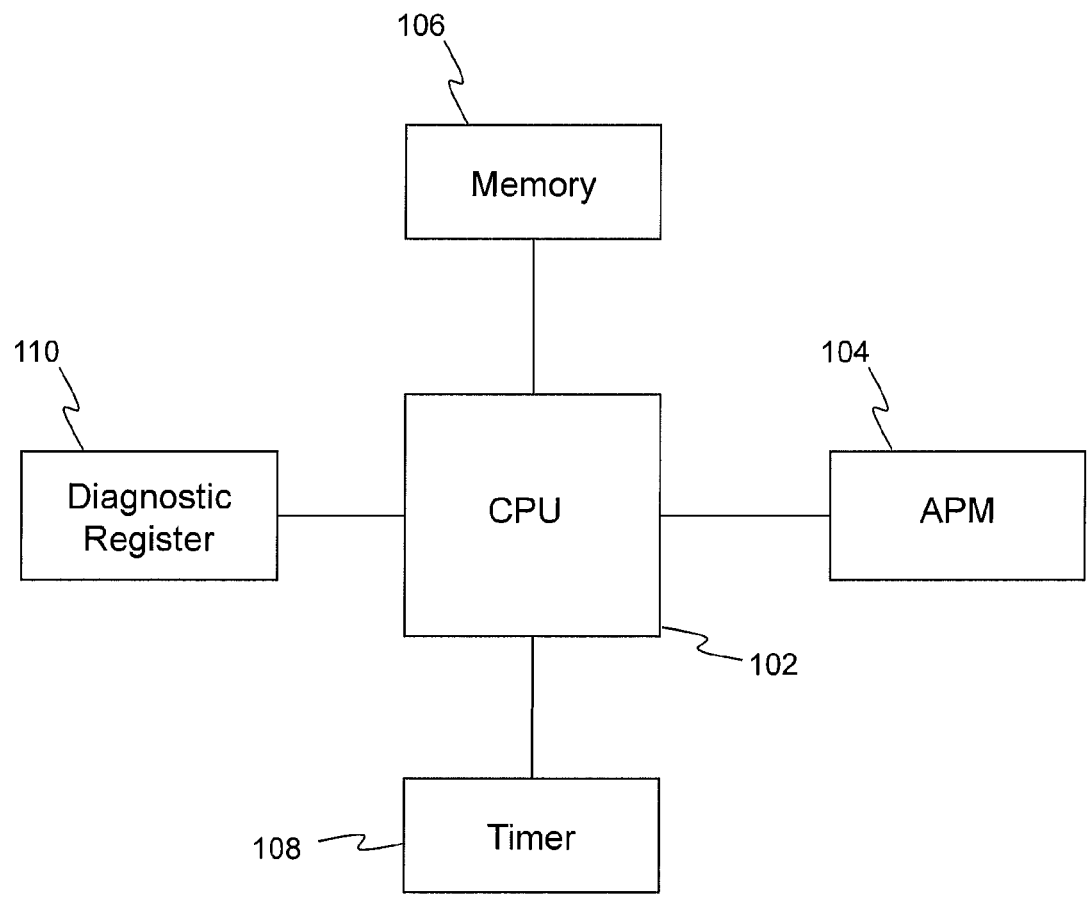
FIG. 1 is a schematic representation of a computing system according to a preferred embodiment.
Figure 2:
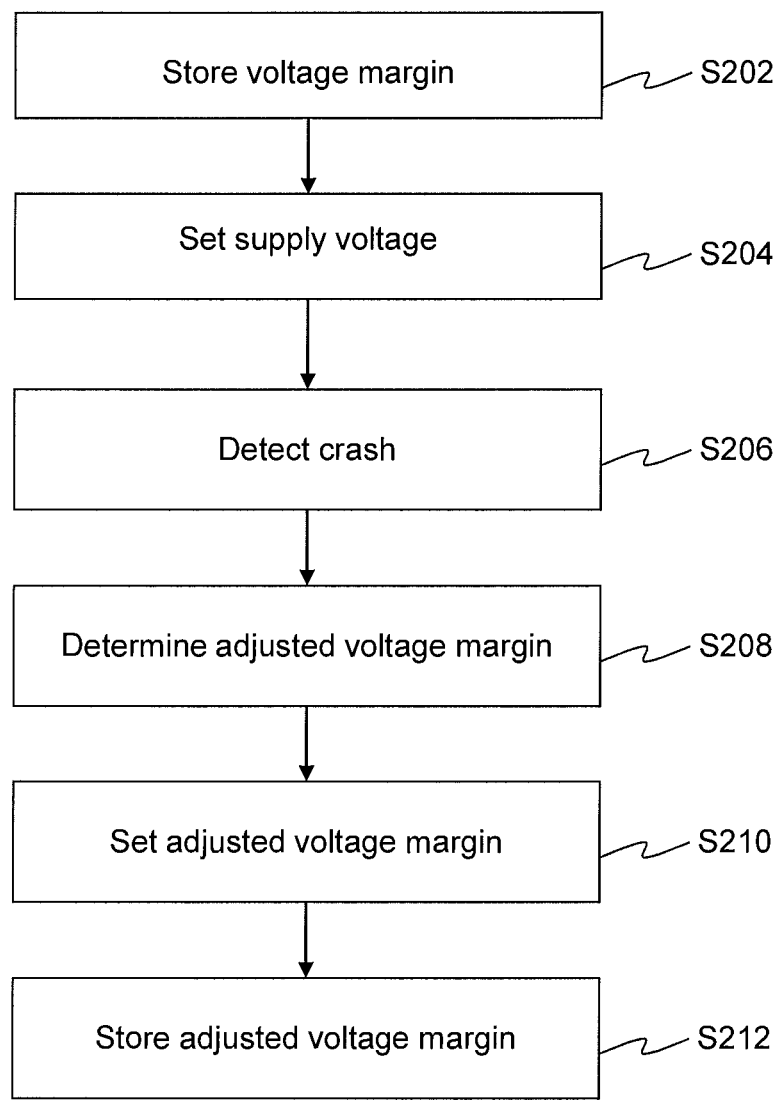
FIG. 2 is a flow chart for a process of controlling a supply voltage according to a preferred embodiment.

FIG. 1 is a schematic representation of a computing system 100 according to a preferred embodiment. The computing system 100 comprises a processor (CPU) 102, an Active Power Management (APM) application 104, a memory 106, a timer 108 and a diagnostic register 110. As shown in FIG. 1, the CPU 102 is coupled to each of the APM application 104, the memory 106, the timer 108 and the diagnostic register 110.

The APM application 104 is configured to control the supply voltage and the clock frequency used in the computing system. The computing system includes an adjustable voltage supply (not shown in FIG. 1), which is controllable by the APM application 104 to thereby adjust the supply voltage provided to the CPU 102. In this way the APM application 104 can ensure that a sufficient clock frequency is used for particular software running on the CPU 102, whilst also controlling the supply voltage such that a sufficient supply voltage is provided to allow the CPU 102 to operate at the selected clock frequency. As described above, a voltage margin is employed by the APM application 104 to keep the supply voltage slightly higher (by an amount that is the voltage margin) than the minimum required voltage. This reduces the occurrences of the supply voltage dropping below the minimum required voltage for the processes in the critical path of the CPU 102, and thereby reduces the frequency of crashes of the computing system 100.

A method of controlling the supply voltage is now described with reference to FIG. 2. In step S202 a suitable voltage margin is determined for each part in the computing system 100 and an indication of a 'safe' voltage margin is stored in the memory 106. The memory 106 is a non-volatile memory, such that the voltage margin is maintained in the memory 106 when the computing system 100 is switched off. In alternative embodiments, the memory 106 is a volatile memory such as Random Access Memory (RAM) which is loaded with the voltage indication by the CPU 102, e.g. when the computing system 100 is rebooted.

When the computing system 100 is rebooted a high supply voltage (i.e. higher than a voltage level having the 'safe' voltage margin) is selected while the computing system is initialised. Once the system has been initialised the supply voltage is set to have the voltage margin that is indicated by the voltage indication stored in the memory 106. In step S204 the supply voltage is set based on the voltage margin stored in the memory 106. The APM application 104 sets the supply voltage accordingly. Initially, the supply voltage margin is set below the 'safe' level of the parts in the critical path. This reduces the power consumption of the computing system 100 as it operates. However, crashes may occur if the supply voltage is too low for the CPU 102 to operate correctly at the selected clock frequency.

In step S206 a crash of the computing system 100 is detected. The crash may be due to the supply voltage being too low. The crash may instead be due to another reason such as a software failure. The timer 108 is for example a watchdog timer, which implements a counter that increases at a regular rate. The software running on the CPU 102 resets the watchdog timer 108 at regular intervals to prevent the counter reaching a threshold level during normal operation of the computing system 100. However, if a crash occurs the counter carries on increasing and reaches the threshold level (because it is not reset by the software). When the counter reaches the threshold level it causes the computing system 100 to be rebooted. This ensures that the computing system 100 can recover from a crash quickly (typically within a few seconds (e.g. 2 seconds) from the occurrence of the crash). When the system reboots the value of the watchdog timer 108 can be used to determine that the reboot is occurring due to a crash of the computing system 100. If the watchdog timer 108 has the threshold value then this indicates that a crash caused the reboot, whereas if the reboot is a normal reboot (e.g. when the user switches the computing system 100 on) the watchdog timer 108 will typically have a count lower than the threshold level. In this way a crash is detected.

In step S208 where a crash is detected an adjusted voltage margin for use in the computing system 100 can be determined. The adjusted voltage margin is chosen to reduce the probability of a crash occurring again. In step S210 the adjusted voltage margin is set for use in the computing system 100. The APM application 104 is used to adjust the supply voltage based on the adjusted voltage margin. For example, the voltage margin may be incremented each time a crash occurs.

In step S212 an adjusted voltage indication of the adjusted voltage margin is stored in the memory 106 for future use in the computing system 100. By storing the adjusted voltage indication in the memory 106, when the computing system 100 is subsequently rebooted the new, adjusted voltage margin will be used. In this way the voltage margin in the computing system 100 is adjusted over time according to the requirements of the computing system. Allowing the computing system to adapt the supply voltage in this way allows the computing system to find a voltage margin that does not result in crashes (or that results in an acceptably small number of crashes) but which may be lower than the 'safe' voltage margin of the components in the computing system. In this way, the power consumption of the computing system is reduced.

The inventor has further realised that not all crashes in the computing system are due to an insufficient voltage margin. Crashes may be caused by many other factors as would be apparent to a skilled person. For example, crashes may be caused by a software failure, unrelated to the voltage margin currently being employed. In step S208, when a crash is detected, instead of incrementing the voltage margin directly, a counter may be incremented. If the counter reaches a threshold level (e.g. two) then the voltage margin is incremented. In this way the voltage margin is not incremented too readily following the detection of a crash. Furthermore, the counter can be reset at regular intervals (e.g. every hour) so that if the system crashes and the crash is caused by an unusual event (e.g. a software failure) then the voltage margin is not necessarily incremented. If the voltage margin is too low for the computing system 100 to operate correctly it is likely that more than one crash will occur in the interval between resets of the counter (e.g. more than two crashes may occur in an hour). In that case the voltage margin is incremented. This feature is based on the concept that unexpected causes for system crashes are unlikely to occur more than once within the interval between resetting the counter, such that these crashes do not effect the voltage margin so much as if the voltage margin is incremented after every crash.

Furthermore, the computing system 100 may be implemented such that if no crashes have been detected within a second interval (e.g. 24 hours) then the voltage margin is decremented. In this way, if the voltage margin is increased too much by the method described above, the voltage margin can be reduced to find the optimum level for the voltage margin. In this way, the computing system 100 can increase and decrease the voltage margin to suit the requirements of the computing system 100. This allows the voltage margin to be optimized to a level at which very few crashes occur due to insufficient voltage margin on the supply voltage whilst the power consumption is no higher than is necessary to achieve this.

The computing system 100 may be configured such that the voltage margin cannot be increased above the 'safe' level of the parts in the computing system 100. To achieve this, the 'safe' level is used as a threshold level for the voltage margin wherein if the voltage margin reaches this threshold level no further adjustments are made to the voltage margin. In this way the power consumption does not become greater than that of the prior art systems.

The method described above can also be useful as parts in the computing system age and their tolerance to low voltage margins decreases. If a part in the computing system 100 requires a voltage margin that is higher than the 'safe' voltage margin, then the method described above will increase the voltage margin to a level that is acceptable for use with this part. The voltage margin is thus adjustable to meet the requirements of the computing system. Furthermore, the voltage margin is optimized for the current conditions of the computing system 100, which may change as the computing system 100 is used.

The method and system described above can be used where the APM application 104 implements a Phase Locked Loop (PLL) or a Frequency Locked Loop (FLL) in order to set the clock frequency and the supply voltage.

If the APM application 104 uses a PLL, typically a ring oscillator is used to set the supply voltage, whereby a look up table is used to determine the frequency that the ring oscillator should operate at for a given clock frequency. The supply voltage is then set to achieve that particular frequency of the ring oscillator. The look up table typically stores a slightly higher frequency than is required in order to generate the supply voltage with a slightly higher voltage than is required (i.e. with a voltage margin). In this way, the voltage indication of the required voltage margin can be stored in the memory 106 in the form of a frequency value for use with the ring oscillator. Alternatively, the voltage indication may be stored as an absolute voltage value or as the voltage margin itself. It will be apparent that any indication of the voltage margin may be used, provided the computing system 100 is capable of interpreting the indication in order to set the supply voltage to have the desired voltage margin.

The diagnostic register 110 can be used to determine the cause of a detected crash. If it is determined that the crash is due to the supply voltage being too low then the voltage margin can be increased as described above following such a crash. However, if the diagnostic register 110 determines that a detected crash was due to another cause, then the voltage margin might not be increased following the crash. In this way, the voltage margin is prevented from being increased unnecessarily following a crash that was not due to an insufficient voltage margin.

While this invention has been particularly shown and described with reference to preferred embodiments, it will be understood to those skilled in the art that various changes in form and detail may be made without departing from the scope of the invention as defined by the appendant claims.

The invention claimed is:

1. A method of controlling a supply voltage in a computing system, the method comprising:
    storing a voltage related indication at a safe level for operating the computing system, for use in setting the supply voltage of the computing system;

setting a supply voltage for normal operating conditions of the computing system below the safe level of the stored voltage related indication;

detecting a crash of the computing system operating at the supply voltage, and in dependence thereon, determining an adjusted indication for use in the computing system, wherein when a crash is detected a counter is incremented;

setting an adjusted supply voltage based on the adjusted indication; and storing the adjusted indication for further use of the computing system.

2. The method of claim 1 wherein the voltage related indication is selected from a voltage margin, and a frequency offset in an oscillator.

3. The method of claim 2 wherein if a crash is not detected in the computing system within a predetermined time period then the indication is decremented.

4. The method of claim 2 wherein when the indication reaches a threshold value no further adjustments to the indication are made.

5. The method of claim 1 wherein when a crash is detected the indication is incremented.

6. The method of claim 1 wherein when the counter reaches a predetermined number the indication is incremented.

7. The method of claim 1 wherein the counter is reset at regular time intervals.

8. The method of claim 1 further comprising determining the cause of the detected crash, wherein the adjusted indication is determined based on the cause of the crash.

9. The method of claim 8 wherein the cause of the crash is determined using a diagnostic register in the computing system.

10. The method of claim 1 further comprising selecting a clock frequency for use in the computing system.

11. The method of claim 10, wherein the supply voltage is set to achieve an oscillator frequency for that clock frequency, wherein a look up table is used to determine the oscillator frequency for that clock frequency.

12. A computing system comprising:
storage means for storing an indication at a safe level for operating the computing system, for use in setting the supply voltage in the computing system;
setting means for setting a supply voltage for normal operating conditions of the computing system below the safe level of the stored indication;
determination means for detecting a crash of the computing system operating at the supply voltage, and in dependence thereon for determining an adjusted indication for use in the computing system;
wherein the computing system is configured to set an adjusted supply voltage based on the adjusted indication, and to store the adjusted indication for further use of the computing system; and
a counter operable to be incremented when a crash is detected.

13. The computing system of claim 12 further comprising:
a diagnostic register for use in determining the cause of a detected crash, wherein the determination means is configured to determine the adjusted voltage indication based on the cause of the crash.

14. The computing system of claim 12 comprising means for comparing the indication to a threshold value to prevent further adjustment when the indication reaches the threshold value.

15. The computing system of claim 12 wherein when the counter reaches a predetermined number the indication is incremented.

16. A computing system comprising:
a memory configured to store a voltage related indication indicating a safe level for operating the computing system, for use in setting the supply voltage in the computing system;
an active power manager configured to set a supply voltage for normal operating conditions of the computing system below the safe level of the stored voltage related indication;
a diagnostic register configured to detect crashes of the computing system, wherein based on a detection of a crash of the computer system operating at the supply voltage, the active power manager is configured to determine an adjusted voltage related indication for use in the computing system;
wherein the computing system is configured to set an adjusted supply voltage based on the adjusted voltage related indication, and to store the adjusted indication in the memory for further use of the computing system; and
a counter operable to be incremented when a crash is detected.

17. The computing system of claim 16 wherein the voltage related indication is a voltage margin.

18. The computing system of claim 16 wherein the active power manager is configured to adapt the voltage related indication in response to the detection of crashes and to the detection of no crashes of the computing system.

19. The computing system of claim 18 wherein the crashes of the computing system are associated with the critical path of the computer system.

20. The computing system of claim 16 wherein the counter is reset at regular time intervals.

* * * * *